(12) United States Patent
Cha

(10) Patent No.: US 12,251,982 B2
(45) Date of Patent: Mar. 18, 2025

(54) CONTROL ARM

(71) Applicant: HYUNDAI MOBIS CO., LTD., Seoul (KR)

(72) Inventor: Seung Hwan Cha, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/613,556

(22) Filed: Mar. 22, 2024

(65) Prior Publication Data

US 2025/0010674 A1  Jan. 9, 2025

(30) Foreign Application Priority Data

Jul. 3, 2023 (KR) .......... 10-2023-0086091

(51) Int. Cl.
*B60G 7/00* (2006.01)

(52) U.S. Cl.
CPC .......... *B60G 7/001* (2013.01); *B60G 2204/41* (2013.01); *B60G 2206/013* (2013.01); *B60G 2206/017* (2013.01); *B60G 2206/10* (2013.01); *B60G 2206/73* (2013.01)

(58) Field of Classification Search
CPC ...... B60G 7/001; B60G 7/04; B60G 2204/41; B60G 2206/01; B60G 2206/013; B60G 2206/017; B60G 2206/10; B60G 2206/7104; B60G 2206/73; B60G 2206/82; B23P 2700/14
See application file for complete search history.

(56) References Cited

U.S. PATENT DOCUMENTS

2011/0121533 A1*  5/2011  Lee .......... B60G 3/202
280/124.128

FOREIGN PATENT DOCUMENTS

| CN | 110497755 A | * | 11/2019 | | |
| CN | 110816184 A | * | 2/2020 | ............. | B29B 11/12 |
| CN | 110843441 A | * | 2/2020 | ............. | B29C 70/68 |
| CN | 114454679 A | * | 5/2022 | | |
| CN | 118046707 A | * | 5/2024 | | |
| KR | 10-2020-0079030 A | | 7/2020 | | |

* cited by examiner

*Primary Examiner* — Jason D Shanske
*Assistant Examiner* — Daniel M. Keck
(74) *Attorney, Agent, or Firm* — NovoTechIP International PLLC

(57) ABSTRACT

Proposed is a control arm including a first panel portion having a first assembly hole, a second panel portion having a second assembly hole and coupled to the first panel portion, a reinforced panel portion interposed between the first panel portion and the second panel portion and coupled to the first assembly hole and the second assembly hole, and a bush mounted into the reinforced panel portion.

10 Claims, 15 Drawing Sheets

CONTROL ARM

CROSS-REFERENCE TO RELATED APPLICATIONS

This application claims priority from and the benefit of Korean Patent Application No. 10-2023-0086091, filed on Jul. 3, 2023, which is hereby incorporated by reference for all purposes as if set forth herein.

TECHNICAL FIELD

Exemplary embodiments relate to a control arm, and more particularly, to a control arm capable of realizing reduced weight and enhanced rigidity.

BACKGROUND

Typically, suspension control arms, each connecting a vehicular body and a suspension to each other, are installed in vehicles. For reduced weight, the control arms are manufactured by performing hole flanging on end portions of two panels and then pressing bushes into hole flanges, respectively.

In recent years, with active developments in environment-friendly vehicles, such as electric vehicles, and focused development in large-sized vehicles, the control arms have been required to have high rigidity, with the bushes exerting high separation forces.

In the related art, the control arms are manufactured by employing techniques that insert a steel-reinforced panel into the middle of the control arm and weld the panel to enhance the rigidity or techniques that assemble a reinforced plate formed of plastic.

However, among the above-mentioned reinforcement techniques in the related art, steel-reinforced-plate welding techniques may cause an excessive increase in weight and the easy occurrence of deformation due to welding. The plastic panel assembling techniques do not bring about an increase in weight, but may cause the occurrence of friction joint between the existing steel panel and the reinforced plastic. Therefore, there is a need to address these problems.

The related art of the present disclosure is disclosed in Korean Patent Application Publication No. 10-2020-0079030 (published on Jul. 2, 2020 and entitled "Control arm constituting vehicle's suspension system and method for manufacturing the control arm").

SUMMARY

Various embodiments, which are contrived to address the above-mentioned problems, are directed to a control arm capable of realizing reduced weight and enhanced rigidity.

In an embodiment, a control arm according to the present disclosure includes: a first panel portion having a first assembly hole; a second panel portion having a second assembly hole and coupled to the first panel portion; a reinforced panel portion interposed between the first panel portion and the second panel portion and coupled to the first assembly hole and the second assembly hole; and a bush mounted into the reinforced panel portion.

In an embodiment, in the control arm, the first panel portion may include: a first panel body having the first assembly hole; a first panel extension portion extending laterally from the first panel body and coupled to the second panel portion; and a first hole flange formed in an end portion of the first panel body in a manner that passes therethrough, the bush being mounted into the first hole flange, and the second panel portion may include: a second panel body having the second assembly hole; a second panel extension portion extending laterally from the second panel body and coupled to the first panel extension portion; and a second hole flange formed in an end portion of the second panel body in a manner that passes therethrough, the bush being mounted into the second hole flange.

In an embodiment, in the control arm, the reinforced panel portion may include: a reinforced panel main portion interposed between the first panel body and the second panel body and coupled to the first assembly hole and the second assembly hole; and a reinforced panel accommodation portion formed in an end portion of the reinforced panel main portion, the bush being mounted into the reinforced panel accommodation portion.

In an embodiment, in the control arm, the reinforced panel main portion may include: a reinforced panel body interposed between the first panel body and the second panel body; and reinforced panel protrusions protrusively formed on both lateral surfaces, respectively, of the reinforced panel body, and coupled to the first assembly hole and the second assembly hole, respectively, by being pressed thereinto.

In an embodiment, in the control arm, the reinforced panel main portion may further include at least one reinforced panel through-hole formed in the reinforced panel body in a manner that passes therethrough.

In an embodiment, in the control arm, the reinforced panel main portion may further include: reinforced panel elastic portions mounted on an outer surface of the reinforced panel protrusion and elastically deformable when coming into contact with the first panel body and the second panel body, respectively.

In an embodiment, in the control arm, the reinforced panel accommodation portion may include: reinforced panel accommodation bodies formed on both end portions, respectively, of the reinforced panel main portion; a reinforced panel accommodation bush formed inside the reinforced panel accommodation body in such a manner that is spaced apart from the reinforced panel accommodation body, the bush being mounted into reinforced panel accommodation bush; and a reinforced panel accommodation rib connecting the reinforced panel accommodation body and the reinforced panel accommodation bush to each other.

In an embodiment, in the control arm, the first hole flange and the second hole flange may be coupled to the reinforced panel accommodation body and the reinforced panel accommodation bush by being pressed therebetween.

In an embodiment, in the control arm, the bush may include: a bush body formed in the shape of a cylinder, arranged inside the reinforced panel accommodation bush, and coupled to the first hole flange and the second hole flange by being pressed thereinto; and a bush elastic portion formed between an outer surface of the bush body and an inner surface of the reinforced panel accommodation bush, and elastically deformable.

In an embodiment, in the control arm, the reinforced panel portion may be formed of an engineering plastic material.

In the control arm according to the present disclosure, the reinforced panel portion is coupled to the first panel portion and the second panel portion by being interposed therebetween. Thus, the rigidity of the first panel portion and the second panel portion can be enhanced.

In addition, according to the present disclosure, the reinforced panel portion is formed of engineering plastic. Thus, the light weighting of the control arm can be achieved, and vehicular fuel efficiency can be improved.

In addition, according to the present disclosure, the reinforced panel elastic portion is mounted on the outer surface of the reinforced panel protrusion. When coming into contact with the first panel body and the second panel body, the reinforced panel elastic portion is elastically deformed. Thus, the occurrence of friction joints in the first panel body and the second panel body can be reduced.

In addition, according to the present disclosure, the first hole flange of the first panel portion and the second hole flange of the second panel portion are integrally coupled to the reinforced panel accommodation body and the reinforced panel accommodation bush by being pressed therebetween. Thus, assembly can be simplified and the rigidity can be enhanced.

In addition, according to the present disclosure, the bush is mounted directly into the first panel portion, the second panel portion, and the reinforced panel portion without the use of a separate member, thereby leading to a reduction in the weight of the control arm. Thus, an improvement in productivity can be achieved by a reduction in manufacturing cost.

DETAILED DESCRIPTION

Figure 1:
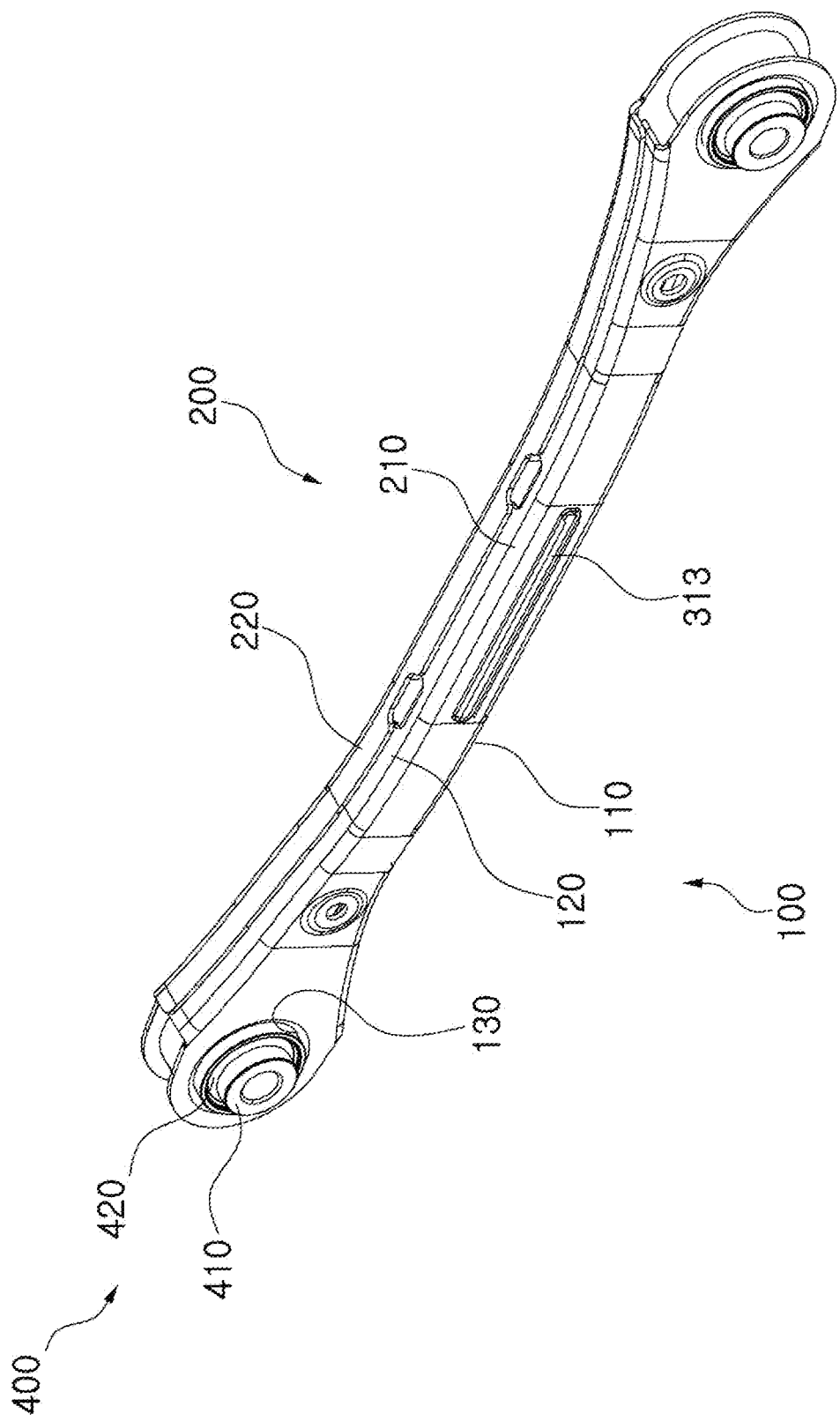
FIG. 1 is a perspective view schematically illustrating a control arm according to an embodiment of the present disclosure.

A control arm according to the present disclosure will be described below with reference to the accompanying drawings. For clarity and convenience in description, thicknesses of lines, sizes of constituent elements, and the like may be illustrated in a non-exact proportion in the drawings.

In addition, terms defined by considering the meanings thereof in the present disclosure will be used below and may vary according to the user's or manager's intention or to practices in the art. Therefore, these terms should be contextually defined in light of the present specification.

Figure 2:
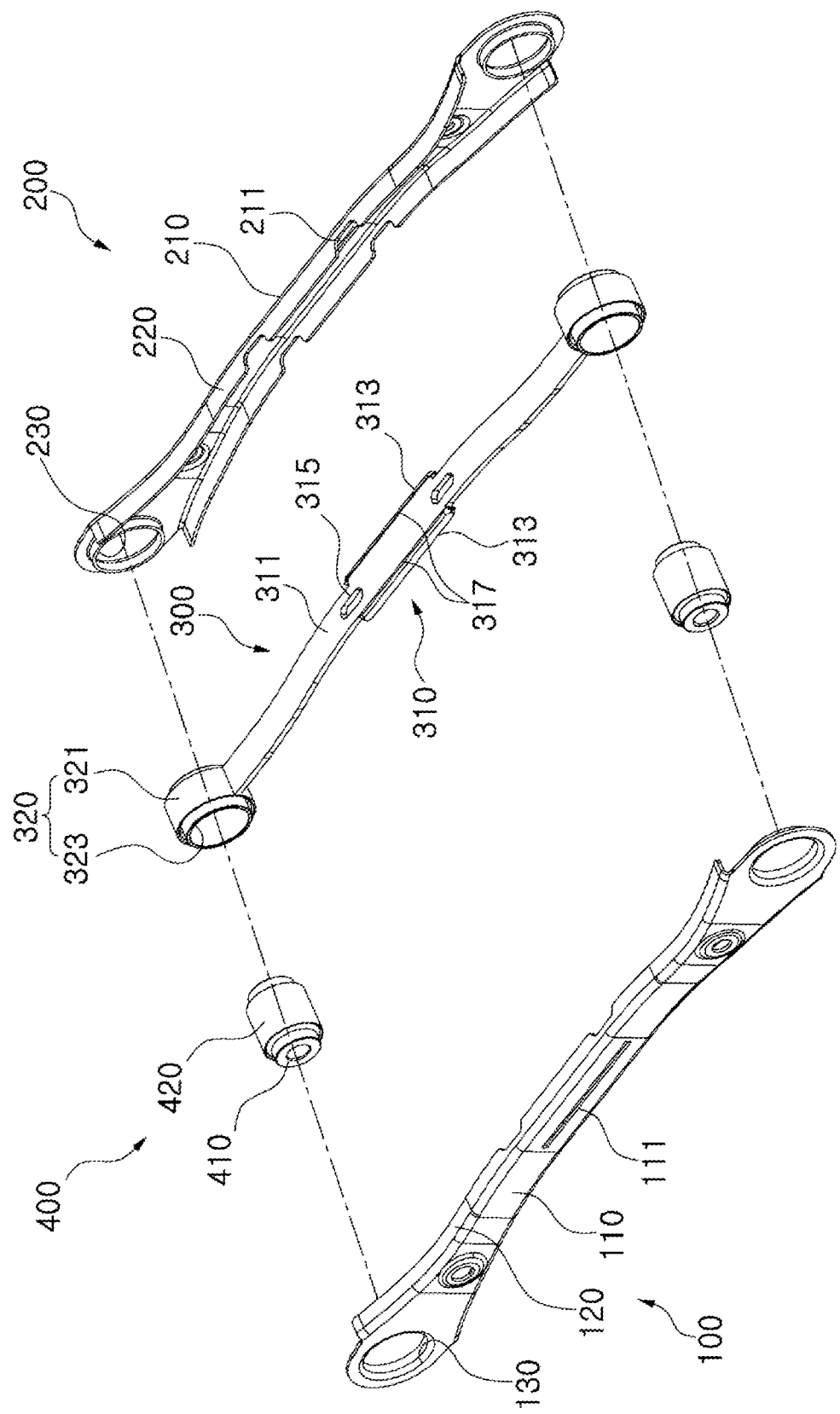
FIG. 2 is a pre-assembly perspective view schematically illustrating the control arm according to the embodiment of the present disclosure.
Figure 3:
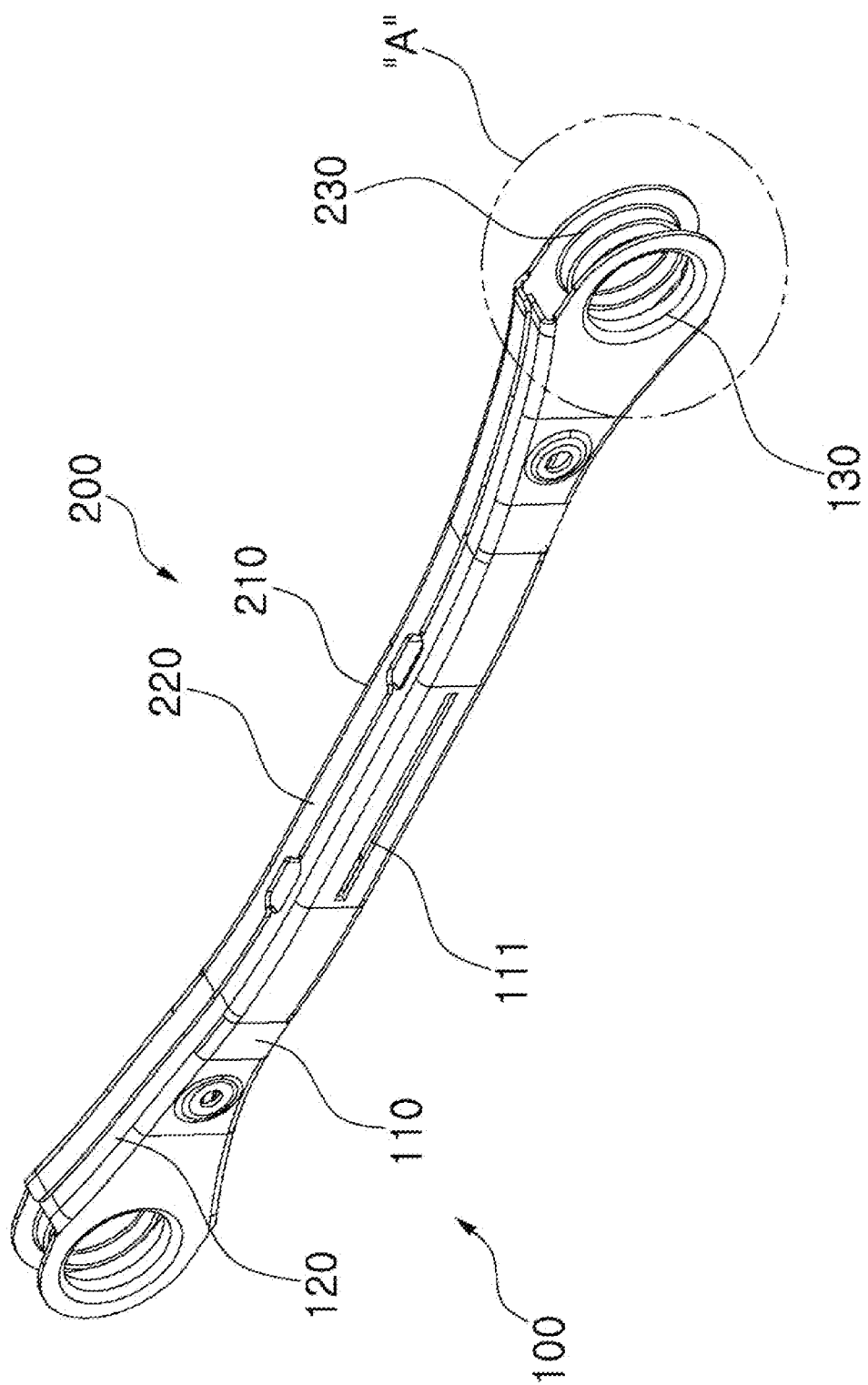
FIG. 3 is a perspective view schematically illustrating a first panel portion and a second panel portion according to the embodiment of the present disclosure.
Figure 4:
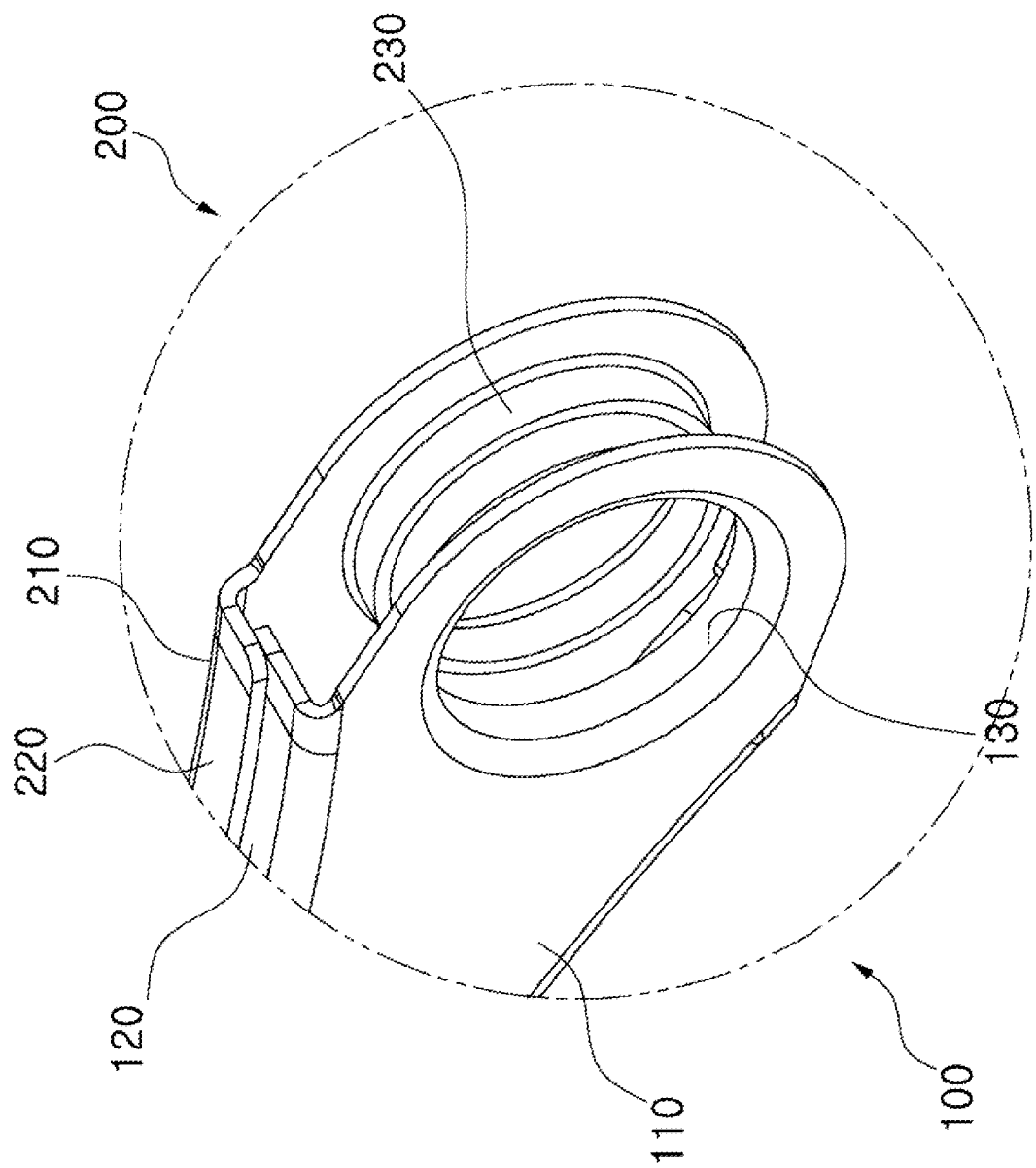
FIG. 4 is a partially enlarged perspective view schematically illustrating circular portion "A" of FIG. 3.
Figure 5:
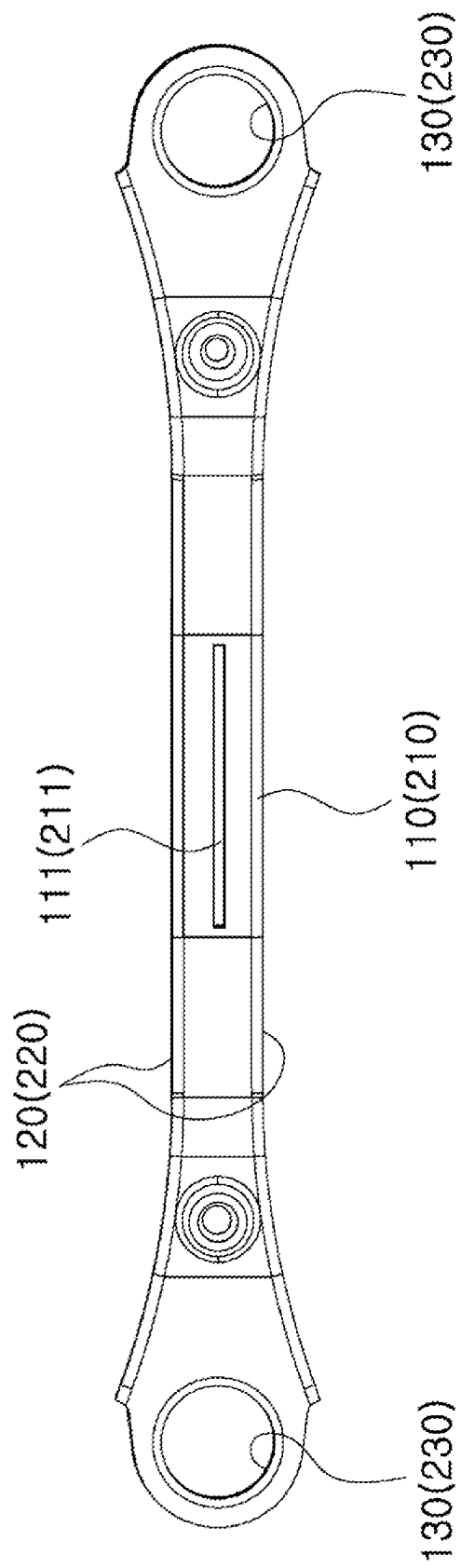
FIG. 5 is a top view schematically illustrating the control arm according to the embodiment of the present disclosure.
Figure 6:
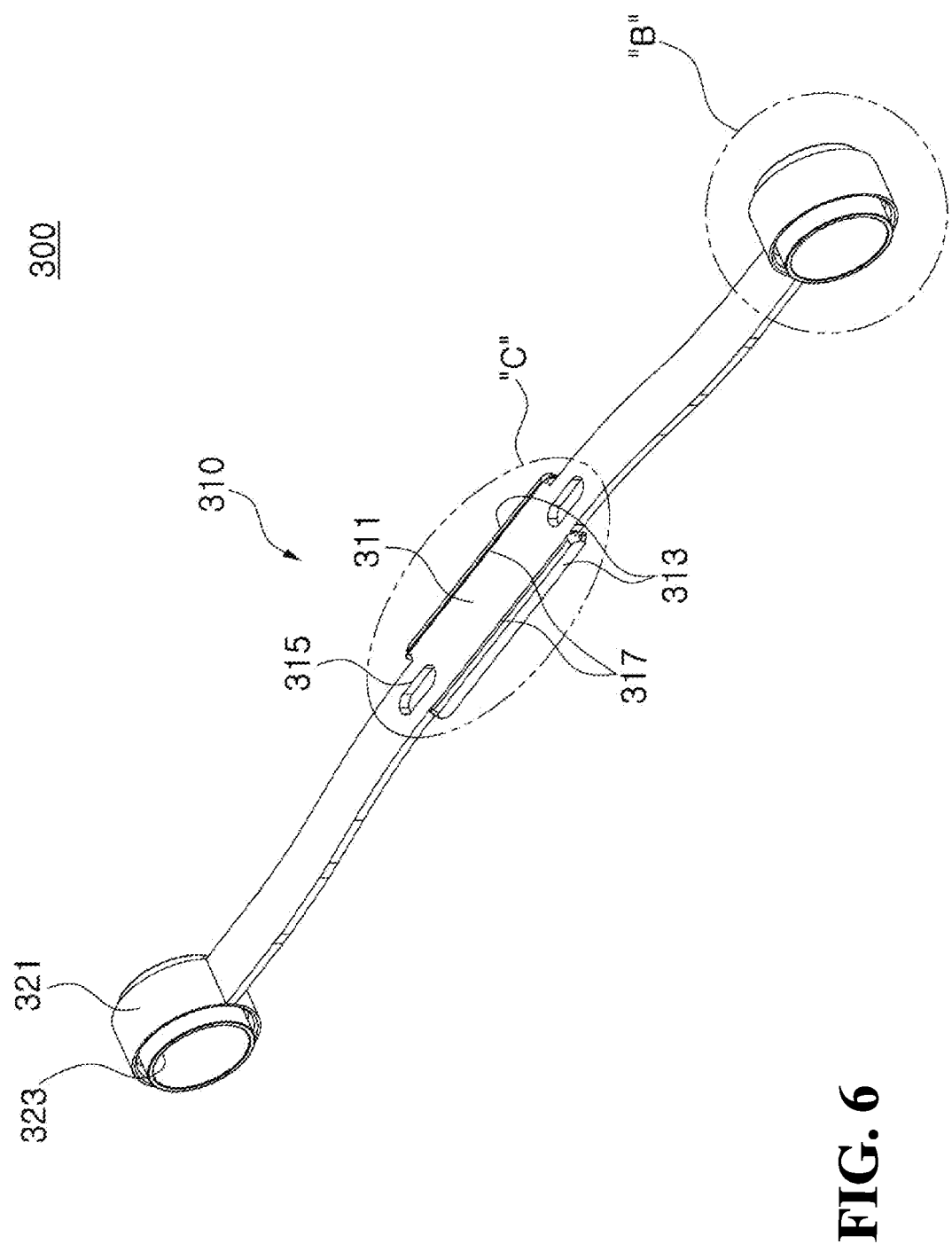
FIG. 6 is a perspective view schematically illustrating a reinforced panel portion according to the embodiment of the present disclosure.
Figure 7:
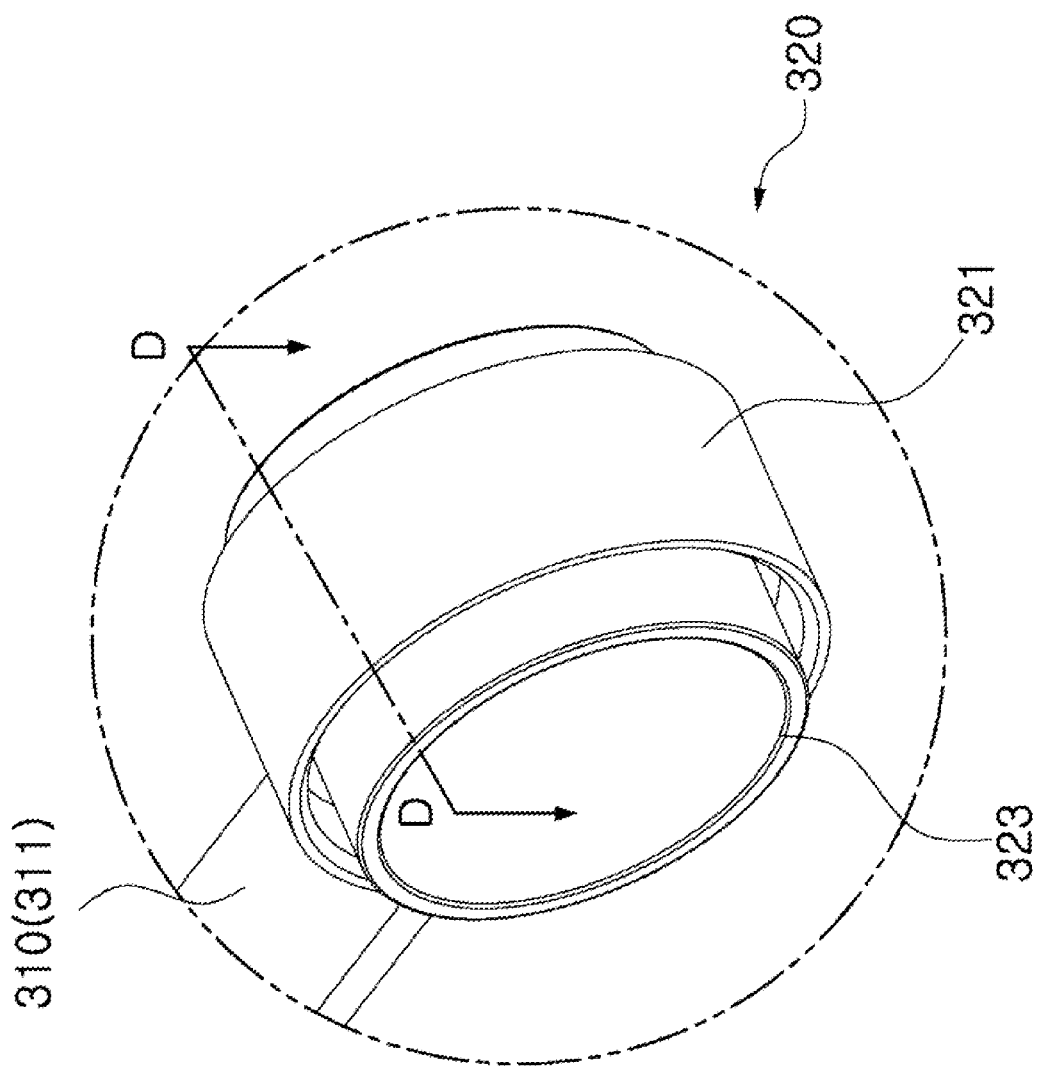
FIG. 7 is a partially enlarged perspective view schematically illustrating circular portion "B" of FIG. 6.
Figure 8:
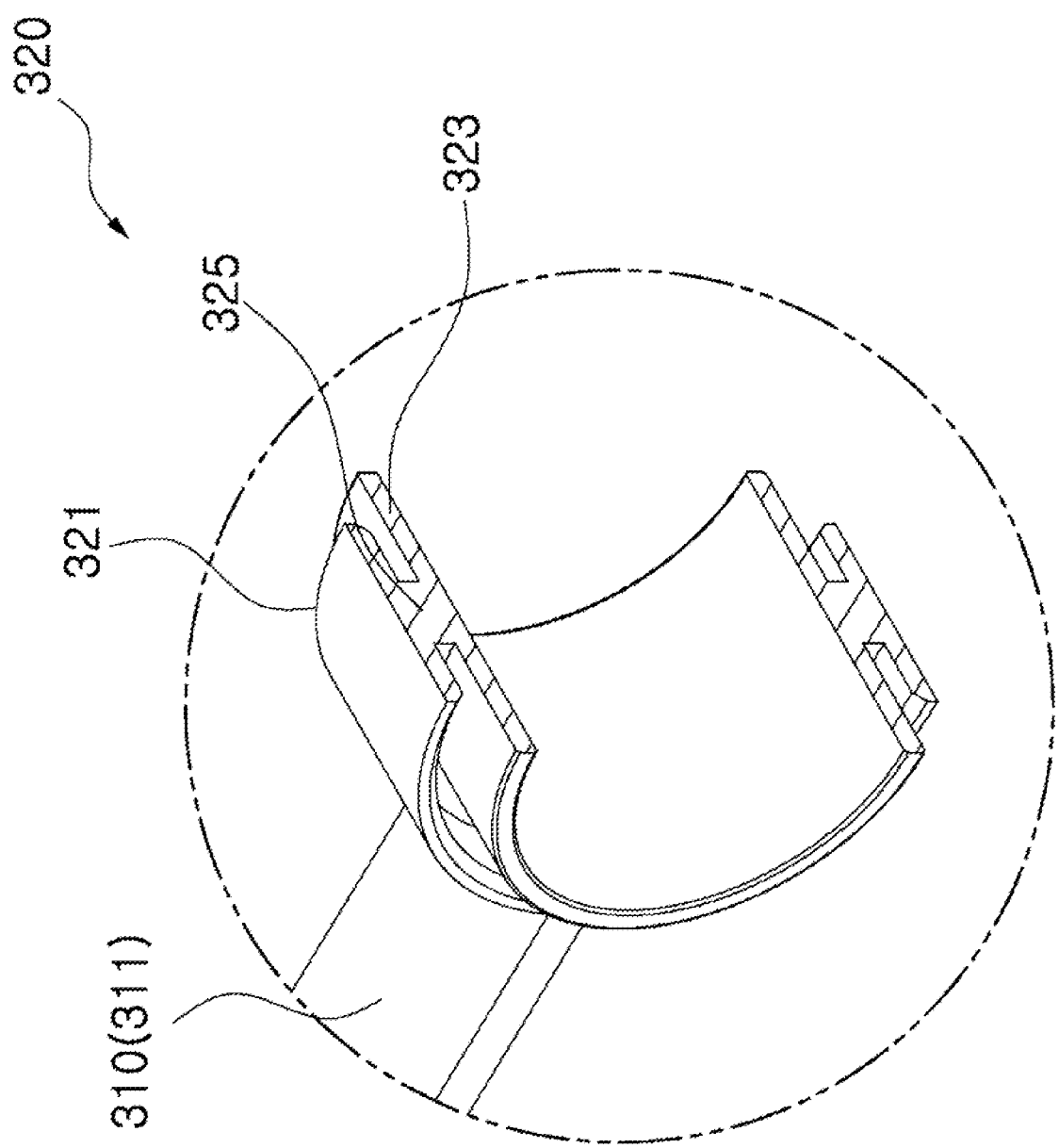
FIG. 8 is a partially enlarged schematic perspective cross-sectional view taken along line D-D on FIG. 7.
Figure 9:
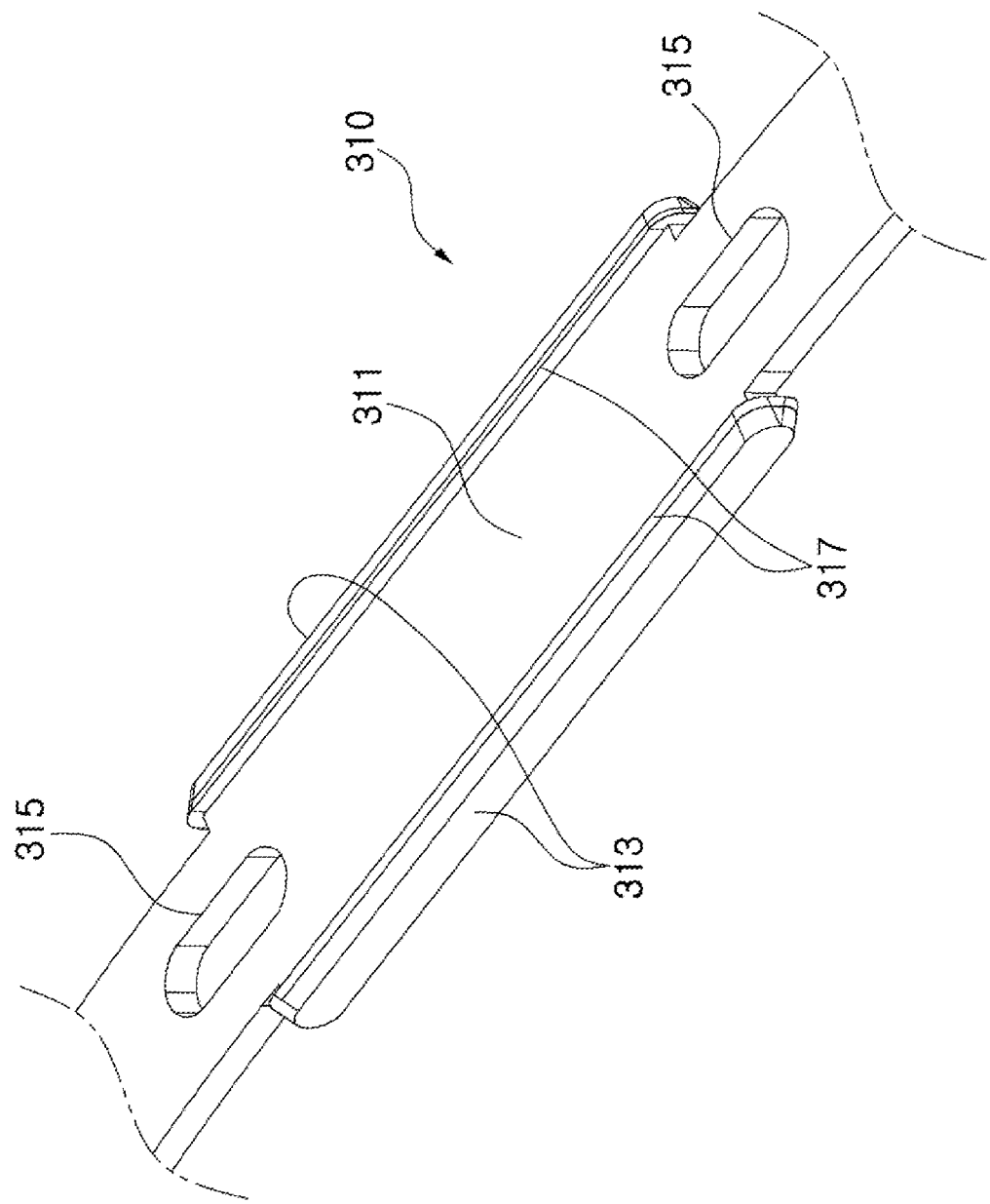
FIG. 9 is a partially enlarged perspective view schematically illustrating elliptical portion "C" of FIG. 6.
Figure 10:
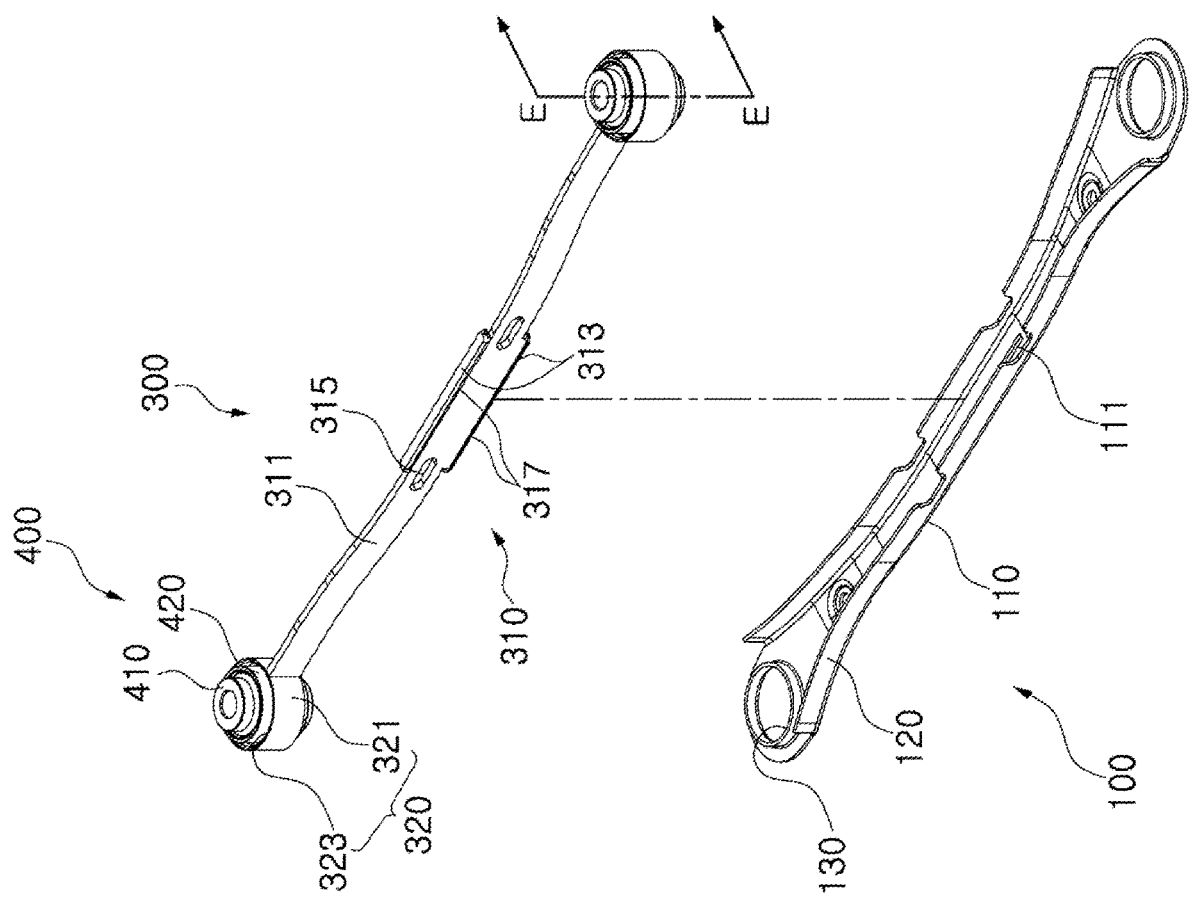
FIG. 10 is a pre-assembly perspective view schematically illustrating mounting of the reinforced panel portion to the first panel portion.
Figure 11:
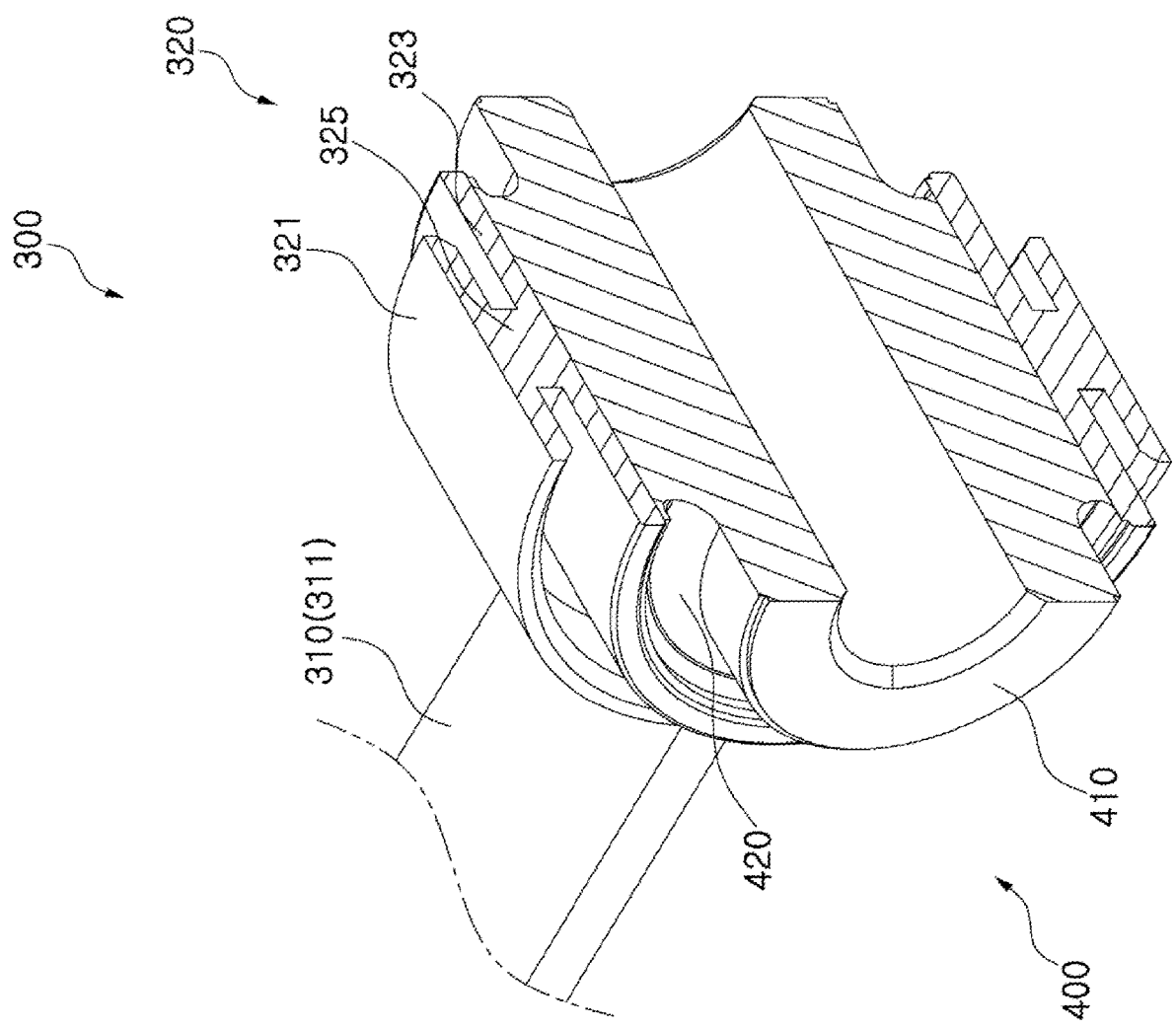
FIG. 11 is a partially enlarged schematic perspective cross-sectional view taken along line E-E on FIG. 10.
Figure 12:
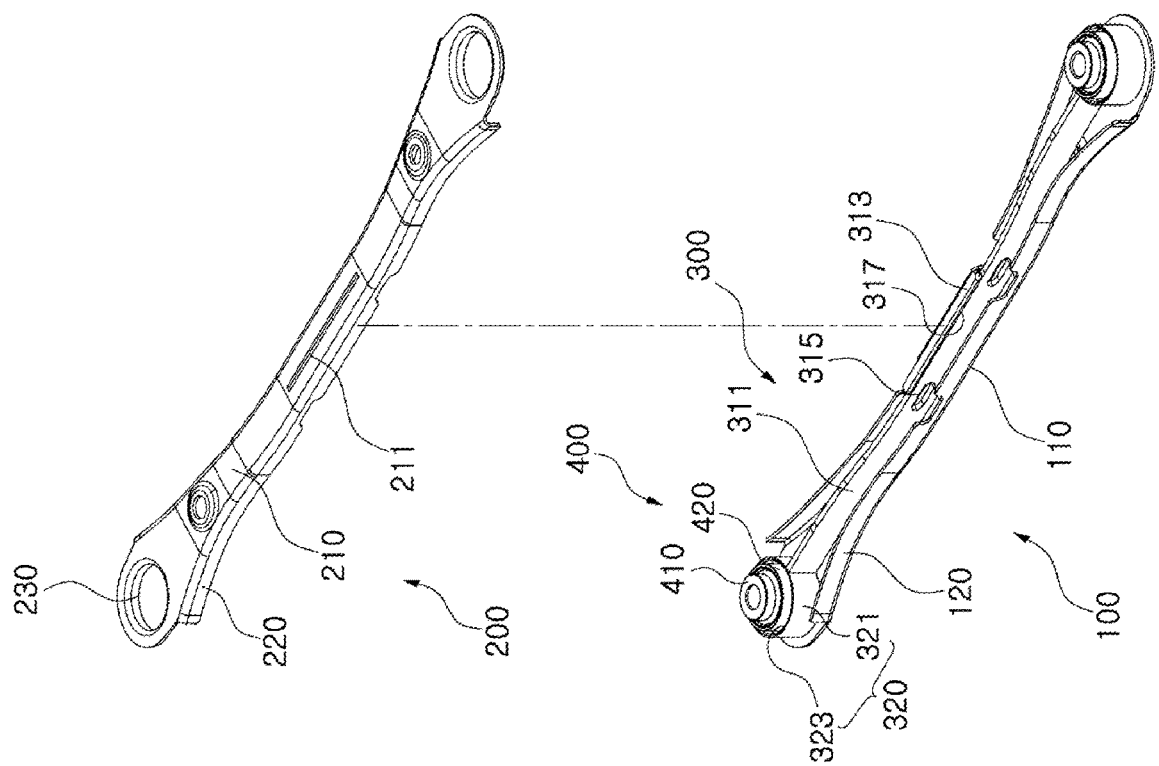
FIG. 12 is a pre-assembly perspective view schematically illustrating mounting of the second panel portion on the first panel portion on which the reinforced panel portion is mounted.
Figure 13:
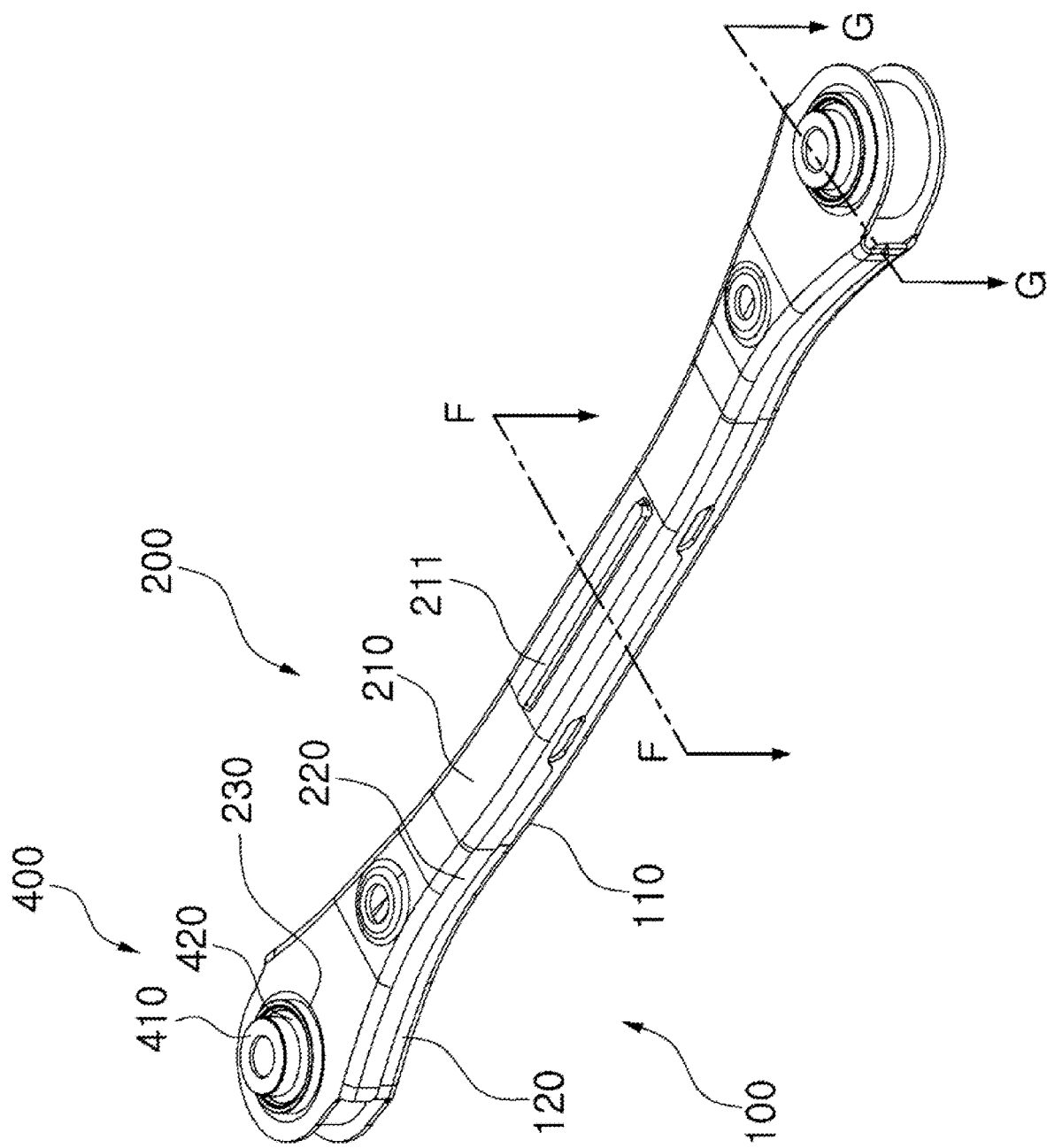
FIG. 13 is a perspective view schematically illustrating the control arm assembled in the order as indicated in FIGS. 10 to 12.
Figure 14:
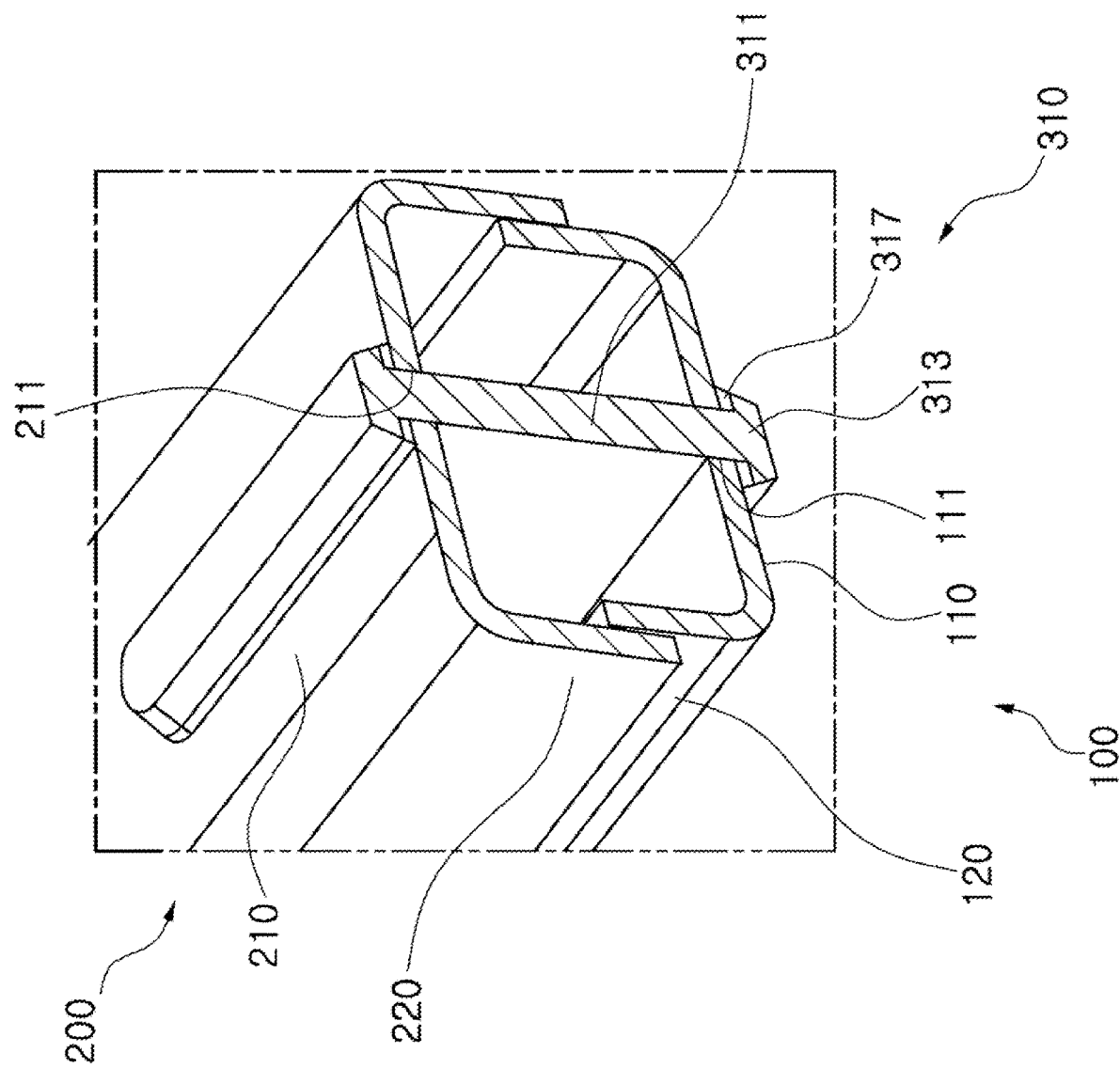
FIG. 14 is a partially enlarged schematic perspective cross-sectional view taken along line F-F on FIG. 13.
Figure 15:
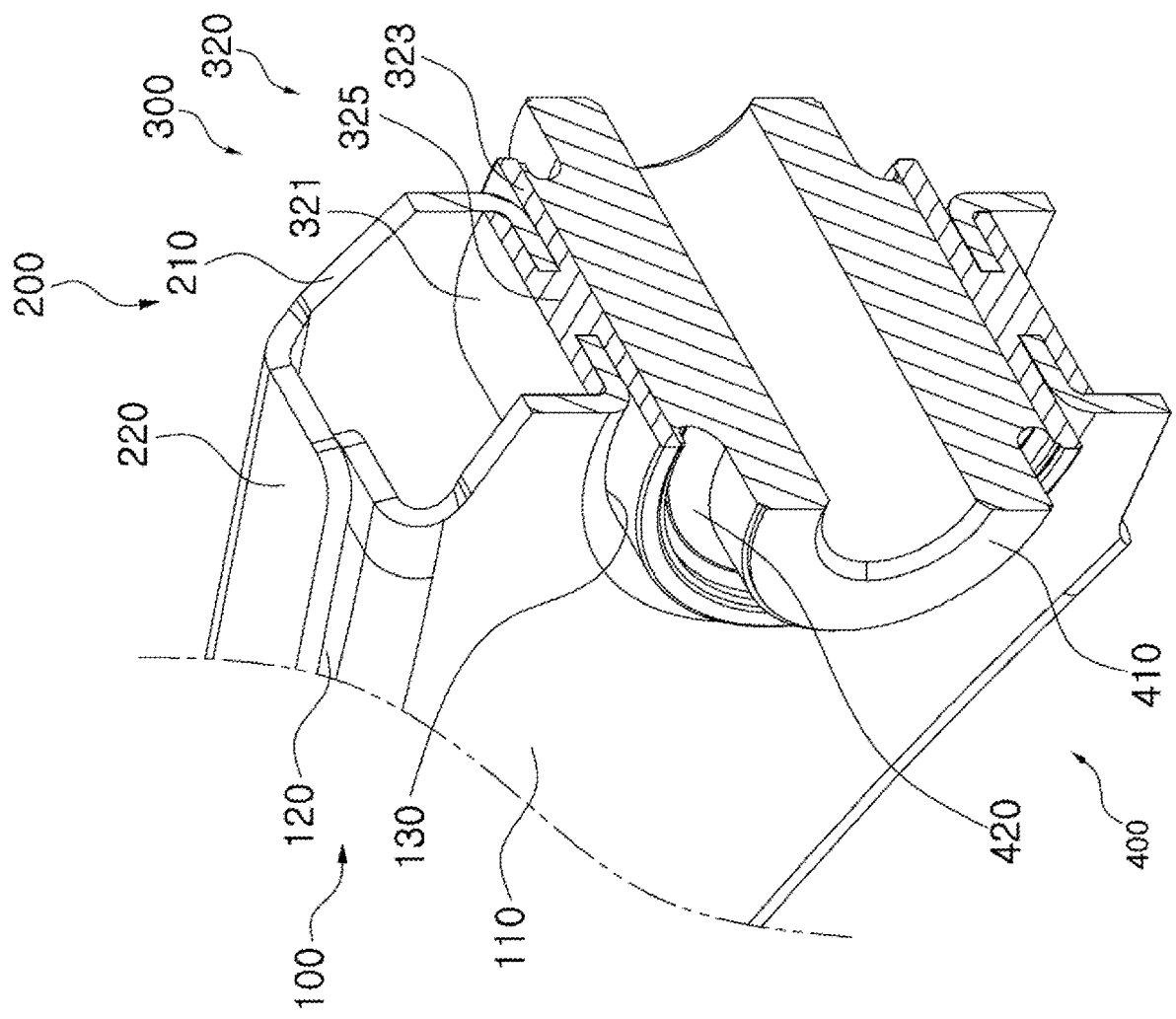
FIG. 15 is a partially enlarged schematic perspective cross-sectional view taken along line G-G on FIG. 13.

FIG. 1 is a perspective view schematically illustrating a control arm according to an embodiment of the present disclosure. FIG. 2 is a pre-assembly perspective view schematically illustrating the control arm according to the embodiment of the present disclosure. FIG. 3 is a perspective view schematically illustrating a first panel portion 100 and a second panel portion 200 according to the embodiment of the present disclosure. FIG. 4 is a partially enlarged perspective view schematically illustrating circular portion "A" of FIG. 3. FIG. 5 is a top view schematically illustrating the control arm according to the embodiment of the present disclosure. FIG. 6 is a perspective view schematically illustrating a reinforced panel portion 300 according to the embodiment of the present disclosure. FIG. 7 is a partially enlarged perspective view schematically illustrating circular portion "B" of FIG. 6. FIG. 8 is a partially enlarged schematic perspective cross-sectional view taken along line D-D on FIG. 7. FIG. 9 is a partially enlarged perspective view schematically illustrating elliptical portion "C" of FIG. 6. FIG. 10 is a pre-assembly perspective view schematically illustrating mounting of the reinforced panel portion 300 to the first panel portion 100. FIG. 11 is a partially enlarged schematic perspective cross-sectional view taken along line E-E on FIG. 10. FIG. 12 is a pre-assembly perspective view schematically illustrating mounting of the second panel portion 200 on the first panel portion 100 on which the reinforced panel portion 300 is mounted. FIG. 13 is a perspective view schematically illustrating the control arm assembled in the order as indicated in FIGS. 10 to 12. FIG. 14 is a partially enlarged schematic perspective cross-sectional view taken along line F-F on FIG. 13. FIG. 15 is a partially enlarged schematic perspective cross-sectional view taken along line G-G on FIG. 13.

With reference to FIGS. 1 to 15, the control arm according to the embodiment of the present disclosure may include the first panel portion 100, the second panel portion 200, the reinforced panel portion 300, and bushes 400.

The first panel portion 100 has a first assembly hole 111 and may be coupled to the second panel portion 200. The second panel portion 200 has a second assembly hole 211 and may be coupled to the first panel portion 100. The reinforced panel portion 300 is interposed between the first panel portion 100 and the second panel portion 200 and may be coupled to the first assembly hole 111 and the second assembly hole 211. The reinforced panel portion 300 is interposed between the first panel portion 100 and the second panel portion 200 and can enhance the rigidity (strength) of the first panel portion 100 and the second panel portion 200.

The bushes 400 may be mounted into the reinforced panel portion 300. The bushes 400 are mounted into both end portions, respectively, of the reinforced panel portion 300 and thus can reinforce the rigidity of both end portions of the reinforced panel portion 300. The bushes 400 are mounted directly into the reinforced panel portion 300 without the use of a separate member, thereby being integrally coupled thereto. This mounting contributes to a reduction in the weight of the control arm, thereby leading to a reduction in the manufacturing cost and consequently an improvement in productivity.

The first panel portion 100 may include a first panel body 110, a first panel extension portion 120, and first hole flanges 130. The first panel body 110 may have the first assembly hole 111 in the center portion. One of reinforced panel protrusions 313 of the reinforced panel portion 300 may be coupled to the first assembly hole 111 by being pressed thereinto.

The first panel extension portion 120 may extend laterally from the first panel body 110 in a manner that faces toward the second panel portion 200 and may be coupled to the second panel portion 200. The first panel extension portion 120 may be coupled to a second panel extension portion 220 of the second panel portion 200 by being pressed thereinto. Alternatively, the first panel extension portion 120 may be coupled, by welding, to the second panel extension portion 220 of the second panel portion 200.

The first hole flanges 130 are formed in both end portions, respectively, of the first panel body 110 in a manner that passes therethrough. The bushes 400 may be mounted into the first hole flanges 130, respectively. The first hole flange 130 may be formed, by hole flanging, in the first panel body 110 in a manner that faces toward the second panel portion 200. The first hole flange 130 may be formed to face a second hole flange 230 of the second panel portion 200.

The second panel portion 200 may include a second panel body 210, a second panel extension portion 220, and the second hole flange 230. The second panel body 210 may extend laterally from the second panel body 210 in a manner that faces toward the first panel portion 100 and may be coupled to the first panel portion 100. The second panel extension portion 220 may be coupled to the first panel extension portion 120 of the first panel portion 100 by being pressed thereinto. Alternatively, the second panel extension portion 220 may be coupled, by welding, to the first panel extension portion 120 of the first panel portion 100.

The second hole flanges 230 are formed in both end portions, respectively, of the second panel body 210 in a manner that passes therethrough. The bushes 400 may be mounted into the second hole flanges 230, respectively. The second hole flange 230 may be formed, by hole flanging, in the second panel body 210 in a manner that faces toward the first panel portion 100. The second hole flange 230 may be formed to face a first hole flange 130 of the first panel portion 100.

The first panel portion 100 and the second panel portion 200 may be formed of the same material. The first panel portion 100 and the second panel portion 200 may be formed of a metal material. The first panel portion 100 and the second panel portion 200 may be formed of metal material including aluminum, steel, and the like. In addition, the first panel portion 100 and the second panel portion 200 may be formed of an engineering plastic material.

The reinforced panel portion 300 may include a reinforced panel main portion 310 and reinforced panel accommodation portions 320. The reinforced panel main portion 310 may be interposed between the first panel body 110 and the second panel body 210 and may be coupled to the first assembly hole 111 and the second assembly hole 211.

The reinforced panel main portion 310 may include a reinforced panel body 311 and the reinforced panel protrusions 313. The reinforced panel body 311 may be interposed between the first panel body 110 and the second panel body 210.

The reinforced panel protrusions 313 may be protrusively formed on both lateral surfaces, respectively, of the reinforced panel body 311 and may be coupled to the first assembly hole 111 and the second assembly hole 211 by being pressed thereinto, respectively. The reinforced panel protrusions 313 may be formed in such a manner that sizes thereof correspond to sizes, respectively, of the first assembly hole 111 and the second assembly hole 211.

The reinforced panel protrusions 313 may be formed in such a manner that widths thereof become narrower toward the first assembly hole 111 and the second assembly hole 211, respectively. The reinforced panel protrusions 313 are formed on the reinforced panel body 311 in a stepped manner. The reinforced panel protrusions 313 formed in a stepped manner may be mounted into the first assembly hole 111 and the second assembly hole 211, respectively.

The reinforced panel protrusions 313 are formed in such a manner that the widths thereof become narrower toward the first assembly hole 111 and the second assembly hole 211, respectively. This formation facilitates the insertion of the reinforced panel protrusions 313 into the first assembly hole 111 and the second assembly hole 211, respectively. The reinforced panel protrusions 313 have such snap-fit structures that they can be prevented from deviating from the first assembly hole 111 and the second assembly hole 211, respectively, after coupled thereto by being inserted and pressed thereinto.

The reinforced panel main portion 310 may further include a reinforced panel through-hole 315. At least one reinforced panel through-hole 315 may be formed in the reinforced panel body 311 in a manner that passes therethrough. The formation of the reinforced panel through-hole 315 in the reinforced panel body 311 in a pass-through manner can contribute to a reduction in the weight of the control arm, thereby enhancing the rigidity thereof. Equal numbers of reinforced panel through-holes 315 may be formed on both sides, respectively, of the center of the reinforced panel body 311.

The reinforced panel main portion 310 may further include reinforced panel elastic portions 317. The reinforced panel elastic portions 317 are mounted on outer surfaces, respectively, of the reinforced panel protrusions 313 and, when coming into contact with the first panel body 110 and the second panel body 210, respectively, elastically deformable. The reinforced panel elastic portion 317 may be formed of elastically deformable rubber, silicone, or the like.

The reinforced panel elastic portions 317 may be mounted on the outer surfaces, respectively, of the reinforced panel protrusion 313. The reinforced panel protrusions 313 may be inserted into the first assembly hole 111 and the second assembly hole 211, respectively. When coming into contact with the first panel body 110 and the second panel body 210, the reinforced panel elastic portions 317 mounted on the outer surfaces of the reinforced panel protrusions 313, may be elastically deformed, thereby reducing the occurrence of friction joints between the first panel body 110 and the second panel body 210.

The reinforced panel accommodation portions 320 are formed in both end portions of the reinforced panel main portion 310 and the bushes 400 may be mounted into the reinforced panel accommodation portions, respectively. The reinforced panel accommodation portion 320 may include a reinforced panel accommodation body 321, a reinforced panel accommodation bush 323, and a reinforced panel accommodation rib 325.

The reinforced panel accommodation bodies 321 may be formed on both end portions, respectively, of the reinforced panel main portion 310. The reinforced panel accommodation bush 323 is formed inside the reinforced panel accommodation body 321 in a manner that is spaced apart from the reinforced panel accommodation body 321. The bush 400 may be mounted into the reinforced panel accommodation bush 323. The reinforced panel accommodation rib 325 may connect the reinforced panel accommodation body 321 and the reinforced panel accommodation bush 323 to each other.

The first hole flange 130 and the second hole flange 230 may be coupled to the reinforced panel accommodation body 321 and the reinforced panel accommodation bush 323 by being pressed therebetween. The first hole flange 130 and the second hole flange 230 are integrally coupled to the reinforced panel accommodation body 321 and the reinforced panel accommodation bush 323 by being pressed therebetween. This integral coupling can simplify the assembly and enhance the rigidity.

The reinforced panel portion 300 may be formed of an engineering plastic material. The reinforced panel portion 300 formed of an engineering plastic material can realize the reduced weight of the control arm and thus improve vehicular fuel efficiency.

Examples of engineering plastic of which the reinforced panel portion 300 is formed include polycarbonate (PC), polyamide (PA), polyoxymethylene (POM), polyphenylene oxide (PPO), polybutylene terephtalate (PBT), and the like.

The bush 400 may include a bush body 410 and a bush elastic portion 420. The bush body 410 may be formed in the shape of a cylinder and may be arranged inside the reinforced panel accommodation bush 323. The bush body 410 may be coupled to the first hole flange 130 and the second hole flange 230 by being pressed therebetween. The pressing of the bush body 410 between the first hole flange 130 and the second hole flange 230 for coupling can enhance the rigidity of the bush body 410, thereby preventing the bush body 410 from deviating therefrom.

The bush elastic portion 420 is positioned between an outer surface of the bush body 410 and an inner surface of the reinforced panel accommodation bush 323 and is elastically deformable. The bush elastic portion 420 may be coupled to the bush body 410 and the reinforced panel accommodation bush 323 by being pressed between the outer surface of the bush body 410 and the inner surface of the reinforced panel accommodation bush 323, thereby being elastically deformed. This elastic deformation can prevent the bush elastic portion 420 from deviating from between the bush body 410 and the reinforced panel accommodation bush 323.

The bush 400 may be mounted directly into the first panel portion 100, the second panel portion 200, and the reinforced panel portion 300 without the use of a separate member, thereby leading to a reduction in the weight of the control arm. Thus, an improvement in productivity can be achieved by a reduction in the manufacturing cost.

A process of assembling the control arm according to the present disclosure is described.

With reference to FIGS. 10 and 11, the bush 400 may be coupled to the reinforced panel accommodation portion 320 in the reinforced panel portion 300 by being pressed thereinto. The bush 400 may be coupled to the reinforced panel accommodation portion 320 in the reinforced panel portion 300 by being pressed thereinto, thereby being integrated with the reinforced panel portion 300.

The reinforced panel protrusion 313 of the reinforced panel portion 300 may be coupled to the first assembly hole 111 in the first panel portion 100 by being pressed thereinto.

The reinforced panel elastic portion 317 may be mounted on the outer surface of the reinforced panel protrusion 313. When coming into contact with the first panel body 110, the reinforced panel elastic portion 317 may be elastically deformed, thereby reducing the occurrence of friction joints when connected to the first panel body 110.

The first hole flange 130 of the first panel body 110 may be coupled to an end portion of the bush body 410 of the bush 400 by being pressed thereinto.

With reference to FIGS. 12 and 13, the second panel portion 200 may be arranged in a manner that faces the first panel portion 100. The reinforced panel portion 300 may be arranged between the first panel portion 100 and the second panel portion 200.

The reinforced panel protrusion 313 of the reinforced panel portion 300 may be coupled to the second assembly hole 211 in the second panel portion 200 by being pressed thereinto.

When coming into contact with the second panel body 210, the reinforced panel elastic portion 317 may be elastically deformed, thereby reducing the occurrence of friction joints when connected to the second panel body 210.

The second hole flange 230 of the second panel body 210 may be coupled to an end portion of the bush body 410 of the bush 400 by being pressed thereinto.

With reference to FIG. 14, the first panel extension portion 120 of the first panel portion 100 and the second panel extension portion 220 of the second panel portion 200 may be coupled to each other by being pressing thereinto.

In the control arm according to the present disclosure, the reinforced panel portion 300 is coupled to the first panel portion 100 and the second panel portion 200 by being interposed therebetween. This coupling can enhance the rigidity of the first panel portion 100 and the second panel portion 200.

In addition, according to the present disclosure, the reinforced panel portion 300 is formed of engineering plastic. The use of this material can realize the reduced weight of the control arm and improve the vehicular fuel efficiency.

In addition, according to the present disclosure, the reinforced panel elastic portions 317 are mounted on the outer surface of the reinforced panel protrusion 313, and, when coming into contact with the first panel body 110 and the second panel body 210, are elastically deformed. This elastic deformation can reduce the occurrence of friction joints between the first panel body 110 and the second panel body 210.

In addition, according to the present disclosure, the first hole flange 130 of the first panel portion 100 and the second hole flange 230 of the second panel portion 200 are integrally coupled to the reinforced panel accommodation body 321 and the reinforced panel accommodation bush 323 by being pressed therebetween. This integral coupling can simplify the assembly and enhance the rigidity.

In addition, according to the present disclosure, the bush 400 may be mounted directly into the first panel portion 100, the second panel portion 200, and the reinforced panel portion 300 without the use of a separate member. This direct mounting can contribute to a reduction in the weight of the control arm. Thus, an improvement in productivity can be achieved by a reduction in the manufacturing cost.

The specific embodiment of the present disclosure is described above. The technical idea of the present disclosure and the scope thereof are not limited to the specific embodiment. It would be apparent to a person of ordinary skill in the art to which the present disclosure pertains that various modifications and alterations are possibly made to the specific embodiment within the scope that does not depart from the subject matter of the present disclosure that is defined in the claims.

What is claimed is:

1. A control arm comprising:
   a first panel portion having a first assembly hole;
   a second panel portion having a second assembly hole and coupled to the first panel portion;
   a reinforced panel portion interposed between the first panel portion and the second panel portion and engaged in the first assembly hole and the second assembly hole; and
   a bush mounted in the reinforced panel portion.

2. The control arm of claim 1, wherein the first panel portion comprises:
   a first panel body having the first assembly hole;
   a first panel extension portion extending laterally from the first panel body and coupled to the second panel portion; and
   a first hole with a flange formed in an end portion of the first panel body, the bush being mounted in the first hole, and
   wherein the second panel portion comprises:
   a second panel body having the second assembly hole;
   a second panel extension portion extending laterally from the second panel body and coupled to the first panel extension portion; and
   a second hole with a flange formed in an end portion of the second panel body in a manner that passes therethrough, the bush being mounted in the second hole.

3. The control arm of claim 2, wherein the reinforced panel portion comprises:
   a reinforced panel main portion interposed between the first panel body and the second panel body and coupled to the first assembly hole and the second assembly hole; and
   a reinforced panel accommodation portion formed in end portions of the reinforced panel main portion, the bush being mounted in the reinforced panel accommodation portion.

4. The control arm of claim 3, wherein the reinforced panel main portion comprises:
   a reinforced panel body interposed between the first panel body and the second panel body; and
   reinforced panel protrusions formed on both lateral surfaces, respectively, of the reinforced panel body, and engaged in the first assembly hole and the second assembly hole, respectively.

5. The control arm of claim 4, wherein the reinforced panel main portion further comprises:
   at least one reinforced panel through-hole formed in and through the reinforced panel body.

6. The control arm of claim 4, wherein the reinforced panel main portion further comprises:
   reinforced panel elastic portions mounted on an outer surface of the reinforced panel protrusions and elastically deformable when coming into contact with the first panel body and the second panel body, respectively.

7. The control arm of claim 3, wherein the reinforced panel accommodation portion comprises:
   a reinforced panel accommodation body formed on both end portions, respectively, of the reinforced panel main portion;
   a reinforced panel accommodation bush formed inside the reinforced panel accommodation body and spaced apart from the reinforced panel accommodation body, the bush being mounted in the reinforced panel accommodation bush; and
   a reinforced panel accommodation rib connecting the reinforced panel accommodation body and the reinforced panel accommodation bush.

8. The control arm of claim 7, wherein the first hole flange and the second hole flange are coupled to and between the reinforced panel accommodation body and the reinforced panel accommodation bush.

9. The control arm of claim 7, wherein the bush comprises:
   a cylindrical bush body arranged inside the reinforced panel accommodation bush and engaging the first hole flange and the second hole flange; and
   a bush elastic portion formed between an outer surface of the bush body and an inner surface of the reinforced panel accommodation bush, the bush elastic portion being elastically deformable.

10. The control arm of claim 1, wherein the reinforced panel portion is formed of an engineering plastic material.

* * * * *